(12) United States Patent
Cameron et al.

(10) Patent No.: US 6,756,935 B1
(45) Date of Patent: Jun. 29, 2004

(54) FULL POLARIZATION GROUND MOVING TARGET INDICATOR RADAR AUTOMATIC TARGET DETECTION ALGORITHM

(75) Inventors: William L. Cameron, Renton, WA (US); Mark A. Curry, Lynnwood, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/356,224

(22) Filed: Jan. 31, 2003

(51) Int. Cl.$^7$ .......................... G01S 13/00; G01S 13/52
(52) U.S. Cl. .......................... 342/90; 342/160; 342/161
(58) Field of Search .......................... 342/28, 90, 160, 342/161, 25

(56) References Cited

U.S. PATENT DOCUMENTS

| | | | | |
|---|---|---|---|---|
| 3,831,174 A | * | 8/1974 | King et al. | 342/90 |
| 4,217,583 A | * | 8/1980 | Hiller et al. | 342/149 |
| 4,375,640 A | * | 3/1983 | Harvey | 342/93 |
| H1181 H | * | 5/1993 | Rihaczek | 342/25 |
| 6,259,396 B1 | * | 7/2001 | Pham et al. | 342/90 |

OTHER PUBLICATIONS

"Moving target imaging in foliage using polarimetric multi-frequency antenna array SAR;" Genyuan Wang; Xiang–Gen Xia; Che V.C.; Radar Conference, 2001. Proceedings of the 2001 IEEE, May 1–3, 2001, pp.: 46–51.*

H. Fain and W.L. Cameron, Full Polarimetric Display of NASA / JPL AIRSAR P–Band Data from Gilmore Creek, AK (1993), Half Moon Bay, CA (1994), and Bishop, CA (1995), tech. rep., 1997, Boeing Defense and Space Group, Seattle, Washington, United States.

W.L. Cameron, Nazih N. Youssef and Ling K. Leung, Simulated Polarimetric Signatures of Primitive Geometrical Shapes, IEEE Transactions on Geoscience and Remote Sensing, May 1996, vol. 34. No. 3. Seattle. Washington. United States.

W.L. Cameron and Ling K. Leung, Identification of Elemental Polarimetric Scatterer Responses in High–resolution ISAR and SAR Signature Measurements, Sep. 8–10, 1992, Secondes Journees Internationales de la Polarimetric Radar, IRESTE, Nantes, France.

W.L. Cameron, Information Content of Linear vs. Circular for Dual Polarization Measurements, tech. rep., 1996, Boeing Phantom Works, Seattle, Washington, United States.

(List continued on next page.)

*Primary Examiner*—Thomas H. Tarcza
*Assistant Examiner*—Brian Andrea
(74) *Attorney, Agent, or Firm*—Black Lowe & Graham PLLC (57) ABSTRACT

A method, apparatus, and system for automatic detection of targets from radar data are disclosed. Ground moving target indicator radar is used to collect radar data which is then filtered to suppress intensity of the clutter ridge. For each working point in a set of radar data, a working first-sense circular transmit/first-sense circular receive radar cross section, a working first-sense circular transmit/second-sense circular receive radar cross section, and a working asymmetry angle are calculated from a scattering matrix, then analyzed to classify the working point as a target point or a clutter point. This analysis suitably is performed by comparing data calculated for each working point to basis data collected in a look-up table in which combinations of a first-sense circular transmit/first-sense circular receive radar cross section, a first-sense circular transmit/second-sense circular receive radar cross section, and an asymmetry angle have been classified as target points or clutter points.

89 Claims, 5 Drawing Sheets

OTHER PUBLICATIONS

W.L. Cameron, Feature Motivated Polarization Scattering Matrix Decomposition, May 7–10, 1990, IEEE 1990 International Radar Conference Record, Arlington, Virginia, United States.

W.L. Cameron, MMW Polarimetric Features for Automatic Target Recognition, Nov. 2–4, 1993, Workshop on the Electromagnetics of Combat–induced Atmospheric Obscurants, El Paso, Texas.

Dr. Michael D. Arthur, Effectiveness of Atmospheric Obscurants on Polarimetric Automatic Target Recognition, Jul. 15, 1994, The Boeing Defense and Space Group, Seattle, Washington, United States.

* cited by examiner

FULL POLARIZATION GROUND MOVING TARGET INDICATOR RADAR AUTOMATIC TARGET DETECTION ALGORITHM

RELATED APPLICATION

This patent application is related to concurrently-filed patent application Ser. No. 10/324,769 entitled "FULL POLARIZATION SYNTHETIC APERTURE RADAR AUTOMATIC TARGET DETECTION ALGORITHM," which is incorporated by reference.

FIELD OF THE INVENTION

This invention relates generally to radio detecting and ranging (radar) systems and, more specifically, to processing radar signals to automatically detect targets.

BACKGROUND OF THE INVENTION

Currently developed automatic radar target detection systems generally lack accuracy for target detection. In particular, space-based radar systems may miss many targets or, on the other hand, may yield high false alarm rates. This problem is particularly acute in detecting slow-moving vehicles because the slow velocity of these vehicles is not as readily distinguishable from Doppler radar processing effects on radar echoes than is the case with faster moving vehicles. Accordingly, currently developed automatic detection systems have minimum detectable velocity (MDV) ratings below what is desired. Generally speaking, current radar transducing technology is capable of providing the data needed to manually and automatically detect targets with greater accuracy. However, methods and systems used to process that data cannot automatically detect targets with sufficient accuracy.

As a result of the shortcomings of automatic target detection, aerial radar platforms currently relay image data to ground stations where human analysts manually inspect the image data for targets. This process is costly in many ways. Manual verification necessitates increased transmission bandwidth to get the image data to the human analysts. Further, a staff of analysts presents considerable manpower and facilities costs. Moreover, this costly process is time-consuming, and therefore undermines the value of the resulting analysis. By the time an analyst receives, reviews, and renders a conclusion, the target may have moved, possibly out of range of further tracking and/or prosecution.

Current automatic target detection research tends to concentrate on systems based on single polarization radar systems. Single polarization radar provides only a single set of planar transmit and receive data. Thus, it is more manageable for processing purposes than multiple polarization radar. Respecting limits of on-board processing systems of radar platforms, therefore, much research has been concentrated in how to better process single polarization radar data to identify targets.

Unfortunately, currently developed single polarization radar processing techniques have yet to yield satisfactory results. For example, the Defense Advanced Research Projects Agency (DARPA) has set as a goal having a detection probability rate of 98 percent, while having a false alarm rate on the order of 0.001 false alarms per square kilometer. However, current automatic target detection systems using single polarization radar with adequate sensitivity generally have false alarm rates of about 2 false alarms per square kilometer. This false alarm rate is orders of magnitude higher than is desired.

Multiple polarization radar has the potential to enhance automatic detection of targets. Multiple polarization radar transmits and receives signals in both vertical and horizontal planes. Thus, multiple polarization radar yields four sets of data. These sets include two forms of single polarization data: vertical transmit/receive data and horizontal transmit/receive data. These sets also include two forms of cross polarization data: vertical transmit/horizontal receive data and horizontal transmit/vertical receive data. Accounting for the varied alignment and resulting reflection of signals by differently oriented targets, multiple polarization radar can potentially detect targets that single polarization radar might not. The wealth of data returned by multiple polarization radar also demands greater processing resources.

In an attempt to exploit multiple polarization radar without exceeding available on-board processing capabilities, current multiple polarization radar automatic detection systems have attempted to limit their processing to one or more yielded parameters, such as radar cross section. Unfortunately, limiting the processing to a single quantity has not resulted in the type of automatic detection accuracy desired. Similarly, combinations of quantities researched to date also have failed to result in desired accuracy within the capabilities of available processing systems.

Thus, there is an unmet need in the art for an automatic target detection algorithm that takes advantage of the data provided by multiple polarization ground moving target indicator radar to yield greater sensitivity and low false alarm rates, particularly in detecting slow-moving targets.

SUMMARY OF THE INVENTION

The present invention provides a system for processing radar signals to more accurately identify targets of interest, particularly moving targets. From data yielded by multiple polarization radar and filtered to enhance moving target signatures and suppress clutter background, targets can be detected with improved accuracy using three quantities which can be readily calculated from the multiple polarization radar data. These calculated quantities can be analyzed to determine whether a point evaluated by the radar constitutes a target point or a clutter point.

An exemplary embodiment of the present invention detects targets in radar signals by first calculating, for a working point in a working radar data, a working first-sense circular transmit/first-sense circular receive radar cross-section, a working first-sense circular transmit/second-sense circular receive radar cross-section, and a working asymmetry angle from a working scattering matrix. These calculated quantities are then evaluated to determine if these quantities indicate the working point is a target point or a clutter point. In one embodiment, the working point is evaluated by comparing the calculated quantities to a look-up table. The look-up table classifies a first-sense circular transmit/first-sense circular receive radar cross-section, a first-sense circular transmit/second-sense circular receive radar cross-section, and an asymmetry angle representing target points and clutter points. The look-up table suitably is derived from basis radar data in which these quantities can be previously classified as representing target points or clutter points. Each of the working points is classified as a target point or a clutter point by reading from previously classified combinations of these quantities as listed in the look-up table.

In a preferred embodiment, ground moving target indicator (GMTI) multiple polarization radar is used to collect basis and working data from both vertical and horizontal single polarization planar transmit and receive data, and one or both cross polarization data scans. A look-up table is created empirically from predetermined information about combinations of a first-sense circular transmit/first-sense circular receive radar cross-section, a first-sense circular transmit/second-sense circular receive radar cross-section, and an asymmetry angle representing target points and clutter points, eliminating suspected cultural clutter points as desired.

BRIEF DESCRIPTION OF THE DRAWINGS

The preferred and alternative embodiments of the present invention are described in detail below with reference to the following drawings.

DETAILED DESCRIPTION OF THE INVENTION

Figure 1A:
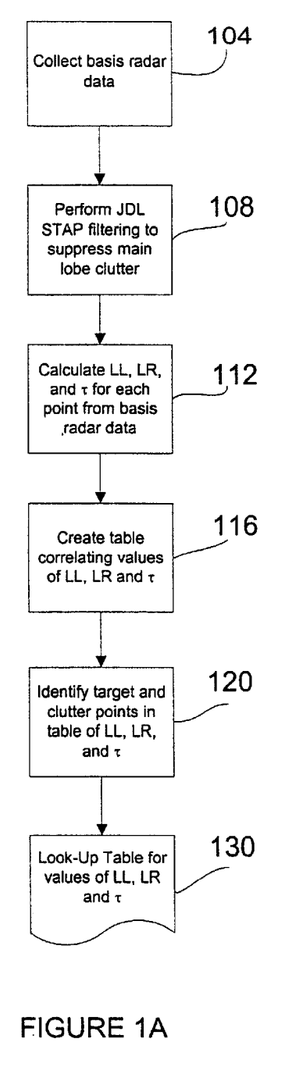
FIG. 1A is a flow chart showing a routine for constructing a look-up table used in an exemplary embodiment of the present invention.

FIG. 1A is a flowchart of a routine for constructing a look-up table used in an exemplary embodiment of the present invention which ultimately will be used to automatically identify targets in radar data. At a block 104, basis radar data is collected. At block 104, a representative area of territory is scanned with radar and the data is recorded. In a preferred embodiment, the radar used is ground moving target indicator (GMTI), multiple polarization radar. The representative area may include known, predetermined targets and known, predetermined clutter, some of which may be of natural origin, and some of which may be cultural in nature. For example, radar scans may be expected to collect data that represent items of natural origin, such as trees, grass, and other flora which do not represent desired targets. Similarly, the radar scans may collect data that represents items of cultural origin, such as streets and buildings which also may not represent selected targets. Control objects also may be used, such as reflectors that yield expected radar echoes, to create a representative but controlled set of basis radar data for use in creating the look-up table.

Once the basis radar data has been collected, the data is filtered to suppress a clutter ridge at a block 108. As is understood in the art, allowing for Doppler effects caused by a moving radar platform results in a clutter ridge which, for a relatively narrow range of Doppler values, extends across the range of the radar scan. This clutter ridge presents an appreciable concern in attempting to identify moving targets. This concern becomes more pressing with slower moving targets. Filtering techniques can reduce prominence of the clutter ridge and, therefore, make it easier to detect even slowly moving vehicles. In one presently preferred embodiment of the invention that uses multiple polarization radar, the filtering is applied individually to each of a plurality of scans of a multiple polarization radar scan. These scans include single polarization scans, including horizontal transmit/horizontal receive and vertical transmit/vertical receive scans, as well as cross-polarization scans, including horizontal transmit/vertical receive and vertical transmit/horizontal receive scans.

Figure 2A:
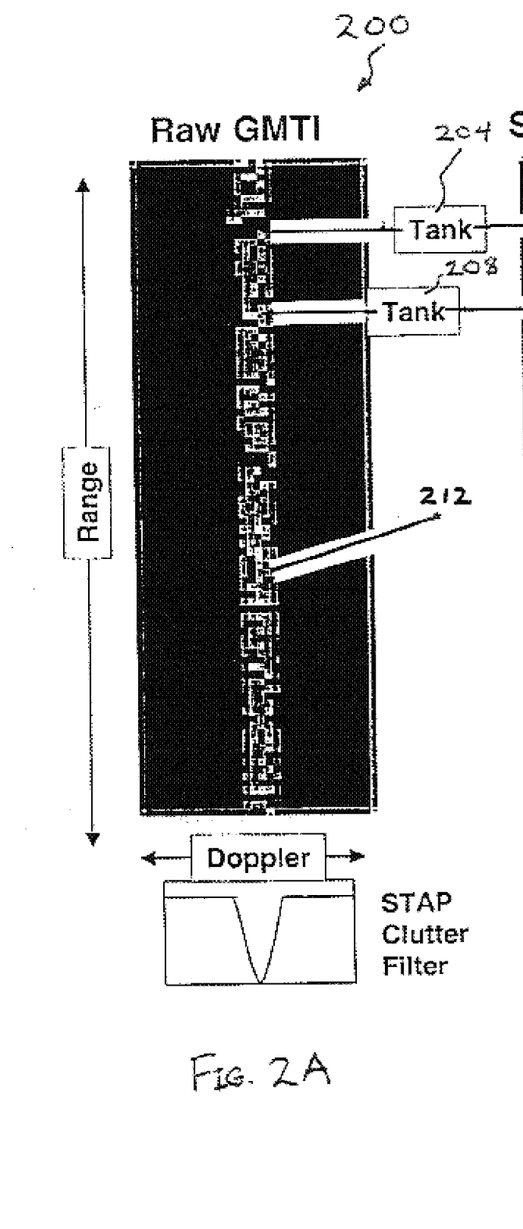
FIG. 2A is a two-dimensional plot of raw range versus Doppler measurements for an exemplary ground moving target indicator (GMTI) radar scan showing a clutter ridge.
Figure 2B:
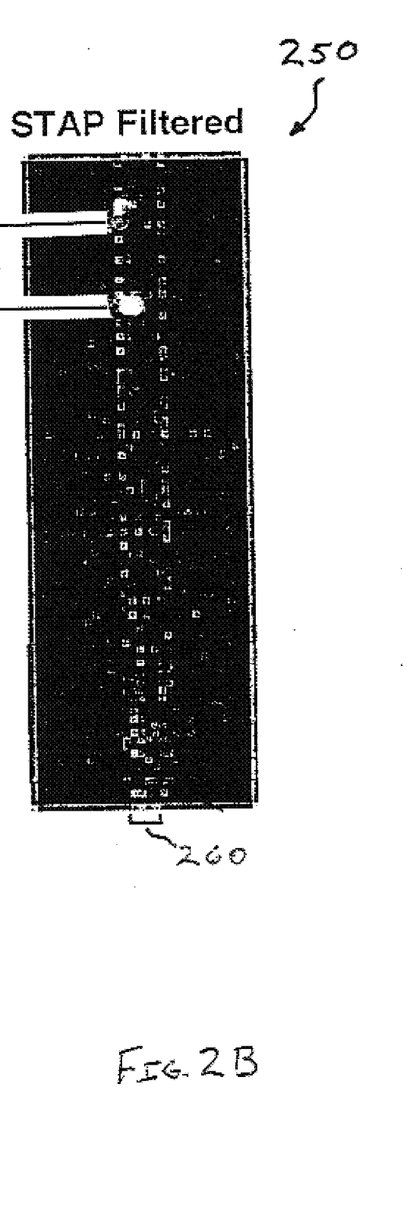
FIG. 2B is a two-dimensional plot of range versus Doppler measurements for the exemplary GMTI radar scan of FIG. 2A after joint domain localized (JDL) space-time adaptive processing (STAP) filtering.

FIG. 2A shows a plot 200 of raw, unfiltered Doppler versus range data for a ground moving target indicator (GMTI) radar scan of a representative area. It is known from predetermined data that points 204 and 208 represent the position of two tanks. However, as can be seen from the plot 200, these points 204 and 208 are obscured by a relatively intense clutter ridge 212. However, by applying filtering, the clutter ridge 212 can be reduced to expose the data points as targets. FIG. 2B shows a plot 250 of radar data of the same representative area data filtered using known techniques to reduce the clutter ridge. In one presently preferred embodiment, space-time adaptive processing (STAP) is used to reduce the intensity of the clutter ridge 212 to a less intense clutter ridge 260. In another embodiment, joint domain localized (JDL) STAP is used to reduce the intensity of the clutter ridge 212 to a less intense clutter ridge 260. The filtering helps to reveal potential targets that otherwise might have gone undetected because the targets were obscured by the clutter ridge 212. Although the reduced clutter ridge 260 is still noticeable as shown in the plot 250, the data points 204 and 208 that represent the targets are much more prominent and are thus easier to discern.

Figure 3A:
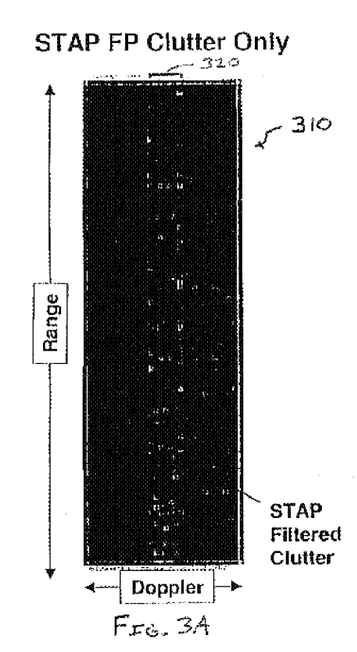
FIG. 3A is a two-dimensional plot of JDL STAP filtered range versus Doppler measurements for an exemplary GMTI radar scan showing only clutter.
Figure 3B:
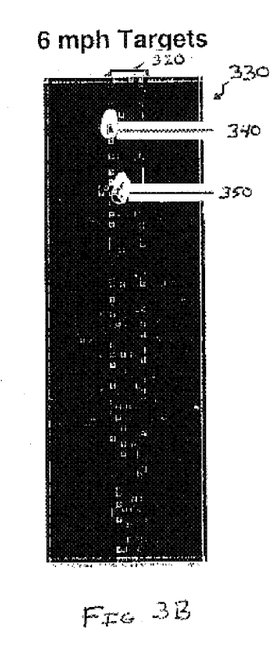
FIG. 3B is another two-dimensional plot of JDL STAP filtered range versus Doppler measurements for an exemplary GMTI radar scan showing two targets each with a radial velocity of six miles per hour.
Figure 3C:
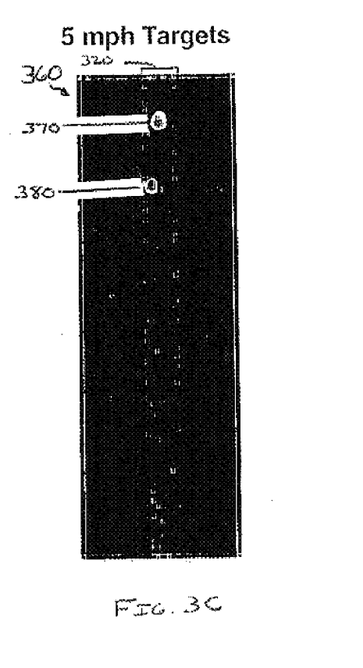
FIG. 3C is another two-dimensional plot of JDL STAP filtered range versus Doppler measurements for an exemplary GMTI radar scan showing two targets each with a radial velocity of five miles per hour.

FIGS. 3A, 3B, and 3C further illustrate advantages of filtering applied to radar data of the representative area. FIG. 3A shows a plot 310 of filtered radar data showing only clutter. The plot 310 has a visible clutter ridge 320, but as shown in the contrast between FIGS. 2A and 2B, the magnitude of the clutter ridge 320 advantageously is greatly reduced. FIG. 3B shows a plot 330 of the same representative area, only this time the representative area also includes data points 340 and 350 representing two target vehicles moving at six miles per hour. It will be appreciated from contrast in magnitude of the clutter ridges 212 and 260 (FIGS. 2A and 2B) that the data points 340 and 350 may have been indistinguishable from the clutter without the application of filtering. FIG. 3C shows a plot 260 of the same representative area with data points 370 and 380 representing two moving vehicles moving at an even slower speed, such as around five miles per hour. While the data points are less pronounced, and potentially even more likely to have been obscured by an unfiltered clutter ridge, both of the data points 370 and 380 are distinct from the clutter ridge 320.

Once the data has been collected and filtered, quantities are calculated to facilitate automatic detection of potential targets at a block 112. Specifically, the values calculated are derived from a scattering matrix. The nature of the scattering matrix is fully described in W. L. Cameron and L. K. Leung, "Feature Motivated Polarization Scattering Matrix Decomposition," IEEE 1990 International Radar Conference Record, Arlington, Va. (conference held May 7, 1990, through May 10, 1990), the contents of which are incorporated by reference. Elemental radar scatterers are represented by polarization scattering matrices. The scattering matrix of an elemental scatterer contains all the information needed to predict the radar signal which will be returned from the scatterer when it is illuminated by a transmit signal which has an arbitrary, but known, polarization state. From the scattering matrix, as is described in detail in the referenced article, values which can delineate between target points and clutter points are derived.

As previously mentioned, the full polarization scattering matrix includes two single polarization components, horizontal transmit/receive data (HH) and vertical transmit/receive data (VV), and two cross polarization components, vertical transmit/horizontal receive data (VH), and horizontal transmit/vertical receive data (HV):

$$S = \begin{pmatrix} HH & VH \\ HV & VV \end{pmatrix} \quad (1)$$

From this matrix, a scattering matrix decomposition is derived:

$$S = \sigma[\cos(\theta)(\cos(\tau)S_{max} + \sin(\tau)S_{min}) + \sin(\theta)S_{NR}] \quad (2)$$

where:
- $\sigma$ represents total radar cross section, which is a function of the size of the object and the electromagnetic properties of the object;
- $\tau$ is the asymmetry angle, which is a function of the geometric complexity of the object; and
- $\theta$ is the reciprocity angle, which is a function of the electromagnetic properties of the material.

Figure 1B:
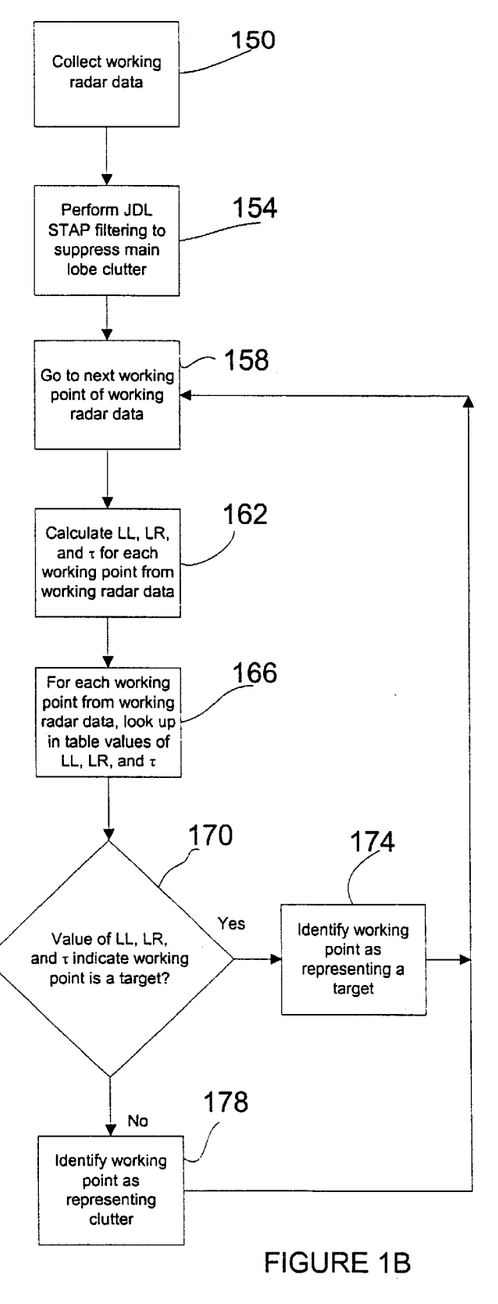
FIG. 1B is a flow chart showing a routine for identifying targets using the look-up table in an exemplary embodiment of the present invention.

Algebraically, equation (2) can be solved to yield numerical values for $\sigma$, $\tau$, and $\theta$ from the radar data matrix S comprised of the single polarization and cross polarization data. Further, using standard linear-to-circular transformation techniques, a first-sense circular transmit/first-sense circular receive radar cross section and a first-sense circular transmit/second-sense circular receive radar cross section can be calculated. It will be appreciated that the first-sense is suitably a left-sense or a right-sense, and the second-sense is suitably the opposite of the first-sense. In FIGS. 1A and 1B, the first-sense is assumed to be a left-sense and the second-sense is assumed to be a right-sense, resulting in left-sense circular transmit/left-sense circular receive (LL) and left-sense circular transmit/right-sense circular receive (LR) radar cross sections. These circular radar cross section quantities, as will be further described below, prove useful in detecting slow moving targets from the radar data.

Much of the accuracy of an exemplary embodiment of the present invention can be realized using only one of the cross polarization data sets. While the highest accuracy is achieved using both single polarization data sets HH and VV that are available when using multiple polarization radar, much of the accuracy of the present invention can be recovered using data from only VH or HV without having to measure and calculate both. In the equation (2), elimination of one of the cross polarization data sets eliminates the last term of the expression, $\sin(\theta)S_{NR}$, which has only a small effect on the result of the calculations.

Radar cross section $\sigma$ has previously been used to attempt to automate the identification of targets. Radar cross section $\sigma$ is an indication of how broadly and strongly an object reflects a radar signal, and manmade objects tend to yield greater radar cross section $\sigma$ values. However, many manmade objects, such as radio towers and buildings may yield a high radar cross section $\sigma$, but not represent a target of interest. Similarly, many natural objects, such as certain tree lines or rock formations, also might yield a high radar cross section $\sigma$. Accordingly, while there is some correlation between an object's radar cross section $\sigma$ and its likelihood to be a desired target, using radar cross section $\sigma$ as a sole indicator of targetworthiness has not provided both satisfactory target sensitivity and workable low false alarm rates.

By contrast, as is known, asymmetry angle $\tau$ gives an indication of the regularity of the shape of an object. Smaller manmade objects, such as vehicles or tanks, have a higher asymmetry angle $\tau$ than do natural objects or larger manmade objects. Advantageously, combining an assessment of total radar cross section $\sigma$ and asymmetry angle $\tau$ yields a highly accurate measure of what might represent a desired target. Accordingly, from the radar data collected in the scan of the representative area at block 104 and clutter-suppressed at block 108, for each point in the radar data the following parameters are calculated at block 112: left circular transmit/left circular receive radar cross-section (LL), a left circular transmit/right circular receive radar cross-section (LR), and asymmetry angle $\tau$.

From this data, at a block 116 a look-up table is formulated in which working values of combinations of first-sense circular transmit/first-sense circular receive radar cross section LL, first-sense circular transmit/second-sense circular receive radar cross section LR, and asymmetry angle $\tau$ can be looked up to determine whether a data point likely represents a target. This look-up table can be conceptualized as a three dimensional plot of these three quantities, each quantity being plotted on a single axis of the graph.

Figure 4:
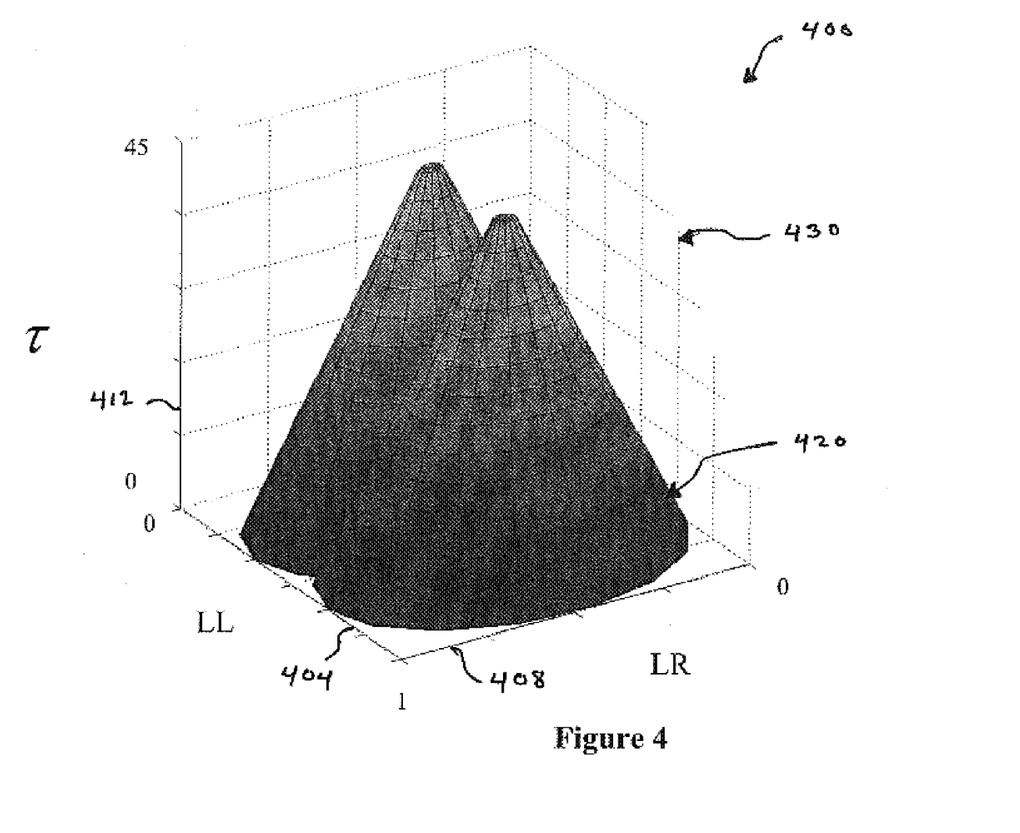
FIG. 4 is a perspective view of a three-dimensional look-up table showing how full polarization, JDL STAP filtered GMTI data are distributed in left-sense circular transmit/left-sense circular receive (LL), left-sense circular transmit/right-sense circular receive (LR) radar cross sections, and asymmetry angle ($\tau$) space.

FIG. 4 shows an example of such a look-up table depicted as a three-dimensional plot 400. On a first axis 404, a left-sense circular transmit/left-sense circular receive radar cross section LL is plotted. On a second axis 408, a left-sense circular transmit/right-sense circular receive radar cross section LR is plotted. Finally, on a third axis 412, asymmetry angle $\tau$ is plotted. Dark areas 420 represent clutter points, while the light areas 430 represent target points. The plot 400 is created empirically from studying calculated values for the operative quantities as compared to predetermined data regarding targets and clutter in the predetermined area. The plot initially might be developed by taking successive radar scans of a predetermined area and, for an intersection point of each of these values, a frequency of clutter versus target findings may form the basis of the initial classification of each point. For example, data points for which a set of values of these quantities indicate clutter for more than a predetermined number of instances are suitably assigned to the dark area 420 as clutter. The rest of the combinations suitably are assigned to a light area 430 as target points. At a block 120 (FIG. 1A), for borderline cases the plot 400 is suitably adjusted to allow for combinations of values that tend to signify types of manmade objects and unusual types of natural structures or formations as clutter.

While conceptually shown as a black and white three-dimensional plot in FIG. 4, the look-up table suitably comprises a three-dimensional data array. For constant values of two of the three quantities, values of a third quantity can be assigned and later searched. At each intersection of data values, a zero suitably represents a data point with a combination of values that should be considered a clutter point, and a one suitably represents a data point that should be considered a target point. In this manner, the look-up table 130 (FIG. 1A) is created for use in automatically identifying targets.

FIG. 1B shows how the look-up table 130 (FIG. 1A) can be used. At a block 150, working radar data is collected. As previously described, full polarization radar might be used, or data from only one of the cross polarization data sets may be used. In a preferred embodiment, the same data sets should be used for collecting the working data as were used for building the look-up table as described in FIG. 1A. Just as for the data used to create the look-up table 130, each data set of the working data is filtered at a block 154 to reduce the prominence of the clutter ridge as previously described.

Once the data has been collected, at a block 158 each point in the working data is examined. At a block 162, a first-sense circular transmit/first-sense circular receive radar cross section LL, a first-sense circular transmit/second-sense circular receive radar cross section LR, and asymmetry angle τ are calculated, similar to how those values were calculated in compiling the basis)data. At a block 166, each of these values is looked up in the look-up table 130 (FIG. 1A). At a decision block 170, if the combination of values of the first-sense circular transmit/first-sense circular receive radar cross section LL, the first-sense circular transmit/second-sense circular receive radar cross section LR, and the asymmetry angle τ looked up has been previously classified as a target, the data point is identified as a target at a block 174. On the other hand, if the combination of values of the first-sense circular transmit/first-sense circular receive radar cross section LL, the first-sense circular transmit/second-sense circular receive radar cross section LR, and the asymmetry angle τ has been previously classified as clutter, the data point is represented as clutter at a block 178 and disregarded. The process continues for each working data point at block 158.

Figure 5:
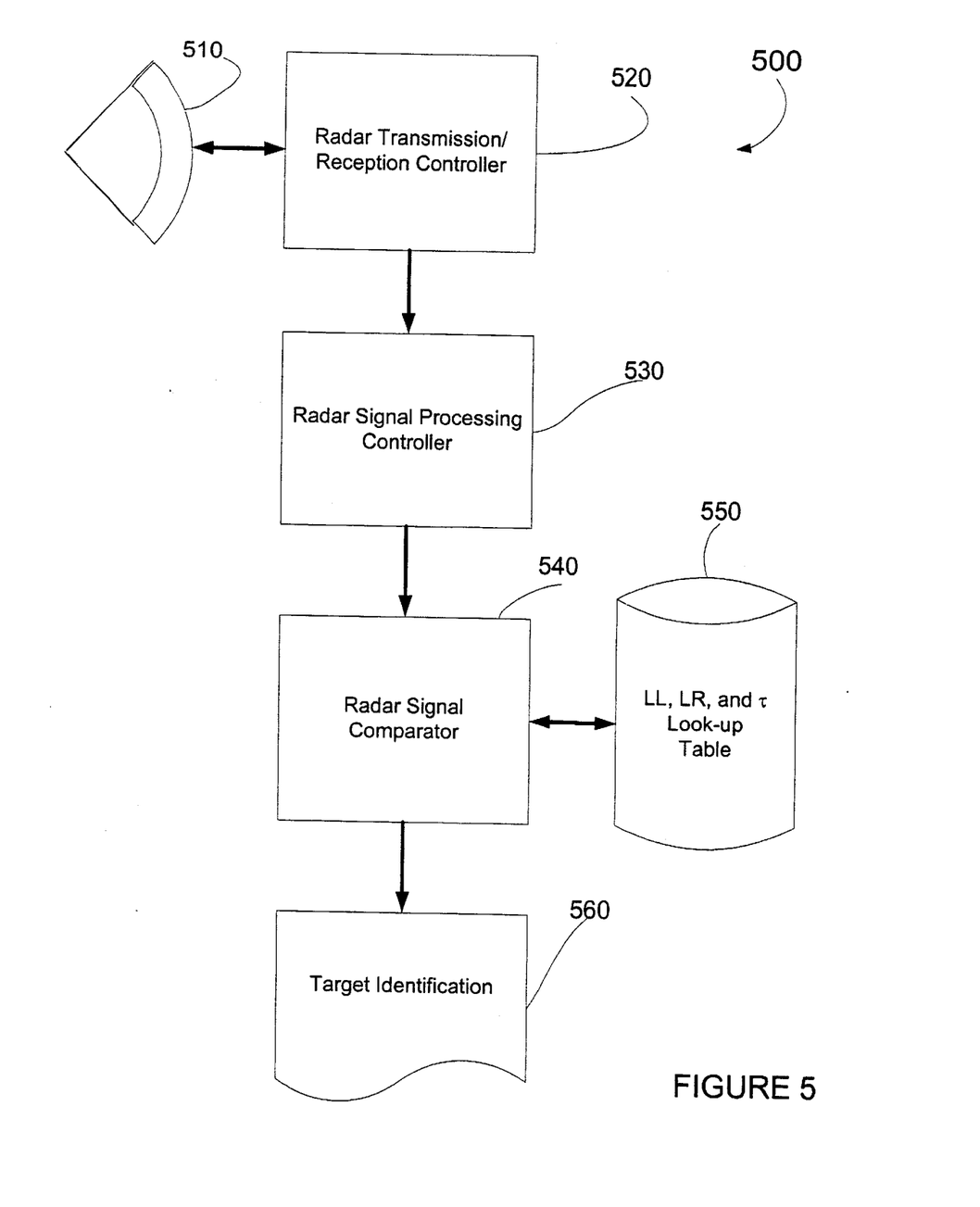
FIG. 5 is a block diagram for a system using an embodiment of the present invention to automatically identify targets in received radar data.

A radar transceiving and processing system 500 employing this process is shown in FIG. 5. A radar transceiver 510 transmits and receives multiple polarization radar signals under the direction of a radar transmission/reception controller 520 to gather radar data for each data point under study. The radar transceiver 510 and the radar transmission/reception controller 520 in one embodiment comprise a GMTI radar system. A typical GMTI radar system is carried by an airborne or space-borne platform, and produces a two-dimensional range-Doppler image. One dimension in the image is called range and is a measure of the distance from the radar transceiver to the object being scanned. Range to the object is determined by measuring the time from transmission of a pulse to receiving the echo from a target. The other dimension is Doppler, representing the radial velocity of the objects within a range gate. GMTI radar resolves targets in range and Doppler. Target Doppler is related to target motion and can be used to separate moving targets from stationary clutter as is understood in the art. Also, multiple polarization radar systems send and receive signals in perpendicular planes. For example, such a system may send and receive signals in orthogonal planes, the intersection of which contains the radar line-of-sight, resulting in the four sets of data previously described. Because the radar platform is moving, adjustments are made for the Doppler shifts otherwise arising from the relative motion of the radar platform to the objects being scanned.

The data collected by the controller 520 is passed to a radar signal processing controller 530, which calculates the scattering matrix data previously described in connection with FIG. 1A. The radar transceiving and processing system 500, the radar signal transmission reception controller 520, and the radar signal processing controller 530 all may be used not only to gather and process working radar data, but also to suitably collect and process the data used to create the look-up table.

Once the computations of the first-sense circular transmit/first-sense circular receive radar cross section LL, the first-sense circular transmit/second-sense circular receive radar cross section LR, and the asymmetry angle τ have been performed by the radar signal processing controller 530, the first-sense circular transmit/first-sense circular receive radar cross section LL, the first-sense circular transmit/second-sense circular receive radar cross section LR, and the asymmetry angle τ are passed to a radar signal comparator 540. The comparator uses a previously created look-up table 550 to determine, based on the values of the first-sense circular transmit/first-sense circular receive radar cross section LL, the first-sense circular transmit/second-sense circular receive radar cross section LR, and the asymmetry angle τ calculated, whether the data point under study should be classified as a target point or a clutter point. A target identification report 560 is thereby generated, automatically identifying desired targets.

While preferred embodiments of the invention have been illustrated and described, many changes can be made to these embodiments without departing from the spirit and scope of the invention. Accordingly, the scope of the invention is not limited by the disclosure of the preferred embodiments. Instead, the scope of the invention should be determined entirely by reference to the claims that follow.

What is claimed is:

1. A method for detecting targets in radar signals, the method comprising:

suppressing a clutter ridge appearing in a working radar data;

calculating for a plurality of working points in the working radar data a working first-sense circular transmit/first-sense circular receive radar cross-section, a working first-sense circular transmit/second-sense circular receive radar cross-section, and a working asymmetry angle from a working scattering matrix; and comparing each of the plurality of working points to determine whether the working first-sense circular transmit/first-sense circular receive radar cross-section, the working first-sense circular transmit/second-sense circular receive radar cross-section, and the working asymmetry angle indicate the working points constitute target points or clutter points.

2. The method of claim 1, further comprising the step of creating a look-up table, the look-up table associating combinations of a first-sense circular transmit/first-sense circular receive radar cross-section, a first-sense circular transmit/second-sense circular receive radar cross-section, and an asymmetry angle as representing target points and clutter points such that the working first-sense circular transmit/first-sense circular receive radar cross-section, the working first-sense circular transmit/second-sense circular receive radar cross-section, and the working asymmetry angle can be looked up in the look-up table to classify the working point as a target point or a clutter point.

3. The method of claim 1, further comprising collecting the working data for a working area of interest.

4. The method of claim 3, wherein the working radar data for the area of interest is collected using ground moving target indicator radar.

5. The method of claim 4, wherein the working data comprises range and Doppler working radar data.

6. The method of claim 1, wherein the suppressing of the clutter ridge is accomplished with filtering.

7. The method of claim 6, wherein the filtering applied to suppress the clutter ridge in the working radar data includes space-time adaptive processing.

8. The method of claim 7, wherein the filtering applied to suppress the clutter ridge in the working radar data includes joint domain localized space-time adaptive processing.

9. The method of claim 1, wherein the first-sense is a left-sense and the second-sense is a right-sense.

10. The method of claim 1, wherein the first-sense is a right-sense and the second-sense is a left-sense.

11. The method of claim 1, wherein the working scattering matrix is derived from working vertical single pole data, working horizontal single pole data, and working cross pole data, the working cross pole data including at least one of a working vertical transmit and horizontal receive scan or a working horizontal transmit and vertical receive scan.

12. The method of claim 1, wherein the working scattering matrix is derived from working vertical single pole data, working horizontal single pole data, and working cross pole data, the working cross pole data including a working vertical transmit and horizontal receive scan and a working horizontal transmit and vertical receive scan.

13. A method for detecting targets in radar signals, the method comprising:

suppressing a clutter ridge appearing in a basis radar data;

calculating for a plurality of basis points in the basis radar data a first-sense circular transmit/first-sense circular receive radar cross-section, a first-sense circular transmit/second-sense circular receive radar cross-section, and an asymmetry angle from a basis scattering matrix;

generating the look-up table of the first-sense circular transmit/first-sense circular receive radar cross-section, the first-sense circular transmit/second-sense circular receive radar cross-section, and the asymmetry angle for the plurality of points in the basis radar data; and classifying in the look-up table combinations of the first-sense circular transmit/first-sense circular receive radar cross-section, the first-sense circular transmit/second-sense circular receive radar cross-section, and the asymmetry angle as target points and clutter points.

14. The method of claim 13, further comprising collecting basis radar data for a representative area of interest.

15. The method of claim 14, wherein the basis radar data for the representative area of interest is collected using ground moving target indicator radar.

16. The method of claim 15, wherein the basis radar data comprises range and Doppler basis radar data.

17. The method of claim 13, wherein the suppressing of the clutter ridge is accomplished with filtering.

18. The method of claim 17 wherein the filtering applied to suppress the clutter ridge in the basis radar data includes space-time adaptive processing.

19. The method of claim 18, wherein the filtering applied to suppress the clutter ridge in the basis radar data includes joint domain localized space-time adaptive processing.

20. The method of claim 13, wherein the first-sense is a left-sense and the second-sense is a right-sense.

21. The method of claim 13, wherein the first-sense is a right-sense and the second-sense is a left-sense.

22. The method of claim 13, wherein the basis scattering matrix is derived from basis vertical single pole data, basis horizontal single pole data, and basis cross pole data, the basis cross pole data including at least one of a basis vertical transmit and horizontal receive scan or a basis horizontal transmit and vertical receive scan.

23. The method of claim 13, wherein the basis scattering matrix is derived from basis vertical single pole data, basis horizontal single pole data, and basis cross pole data, the basis cross pole data including a basis vertical transmit and horizontal receive scan and a basis horizontal transmit and vertical receive scan.

24. The method of claim 13, wherein the identifying of the target points and the clutter points in the look-up table is derived manually by comparing the basis radar data for the representative area of interest with predetermined data.

25. The method of claim 13, wherein the identifying of the target points and the clutter points in the look-up table is manually adjusted to classify predetermined clutter points.

26. A method for detecting targets in radar signals, the method comprising:

suppressing a clutter ridge appearing in a basis radar data;

calculating for a plurality of basis points in the basis radar data a first-sense circular transmit/first-sense circular receive radar cross-section, a first-sense circular transmit/second-sense circular receive radar cross-section, and an asymmetry angle from a basis scattering matrix;

generating the look-up table of the first-sense circular transmit/first-sense circular receive radar cross-section, the first-sense circular transmit/second-sense circular receive radar cross-section, and the asymmetry angle for the plurality of points in the basis radar data; and classifying in the look-up table combinations of the first-sense circular transmit/first-sense circular receive radar cross-section, the first-sense circular transmit/second-sense circular receive radar cross-section, and the asymmetry angle as target points and clutter points, suppressing a clutter ridge appearing in a working radar data;

calculating for a plurality of working points in the working radar data a working first-sense circular transmit/first-sense circular receive radar cross-section, a working first-sense circular transmit/second-sense circular receive radar cross-section, and a working asymmetry angle from a working scattering matrix;

comparing each of the plurality of working points to a look-up table, the look-up table correlating combinations of a first-sense circular transmit/first-sense circular receive radar cross-section, a first-sense circular transmit/second-sense circular receive radar cross-section, and an asymmetry angle representing target points and clutter points; and correlating working points with target points identified in the look-up table.

27. The method of claim 26, further comprising collecting the basis radar data for the representative area of interest.

28. The method of claim 27, wherein the basis radar data for the area of interest is collected using ground moving target indicator radar.

29. The method of claim 28, wherein the basis data comprises range and Doppler working radar data.

30. The method of claim 26, wherein the suppressing of the clutter ridge is accomplished with filtering.

31. The method of claim 30 wherein the filtering applied to suppress the clutter ridge in the basis radar data is space-time adaptive processing.

32. The method of claim 31, wherein the filtering applied to suppress the clutter ridge in the basis radar data is joint domain localized space-time adaptive processing.

33. The method of claim 26, wherein the first-sense is a left-sense and the second-sense is a right-sense.

34. The method of claim 26, wherein the first-sense is a right-sense and the second-sense is a left-sense.

35. The method of claim 26, wherein the basis scattering matrix is derived from basis vertical single pole data, basis horizontal single pole data, and basis cross pole data, the basis cross pole data including at least one of a basis vertical transmit and horizontal receive scan or a basis horizontal transmit and vertical receive scan.

36. The method of claim 26, wherein the basis scattering matrix is derived from basis vertical single pole data, basis horizontal single pole data, and basis cross pole data, the basis cross pole data including a basis vertical transmit and horizontal receive scan and a basis horizontal transmit and vertical receive scan.

37. The method of claim 26, wherein the identifying of the target points and the clutter points in the look-up table is derived manually by comparing the basis radar data for the representative area of interest with predetermined data.

38. The method of claim 26, wherein the identifying of the target points and the clutter points in the look-up table is manually adjusted to classify predetermined clutter points.

39. The method of claim 26, further comprising collecting the working data for a working area of interest.

40. The method of claim 39, wherein the working radar data for the area of interest is collected using ground moving target indicator radar.

41. The method of claim 40, wherein the working data comprises range and Doppler working radar data.

42. The method of claim 41, wherein the suppressing of the clutter ridge is accomplished with filtering.

43. The method of claim 42, wherein the filtering applied to suppress the clutter ridge in the working radar data is space-time adaptive processing.

44. The method of claim 43, wherein the filtering applied to suppress the clutter ridge in the working radar data is joint domain localized space-time adaptive processing.

45. The method of claim 26, wherein the working scattering matrix is derived from working vertical single pole data, working horizontal single pole data, and working cross pole data, the working cross pole data including at least one of a working vertical transmit and horizontal receive scan or a working horizontal transmit and vertical receive scan.

46. The method of claim 26, wherein the working scattering matrix is derived from working vertical single pole data, working horizontal single pole data, and working cross pole data, the working cross pole data including a working vertical transmit and horizontal receive scan and a working horizontal transmit and vertical receive scan.

47. A system for detecting targets in multiple polarization radar signals, the system comprising:
 a radar transceiver operable to collect working radar data for a working area of interest;
 a first filter configured to suppress a clutter ridge appearing in the working radar data;
 a radar signal processor for calculating for a plurality of working points in the working radar data a working first-sense circular transmit/first-sense circular receive radar cross-section, a working first-sense circular transmit/second-sense circular receive radar cross-section, and a working asymmetry angle from a working scattering matrix; and
 a comparator for comparing calculated values of the working first-sense circular transmit/first-sense circular receive radar cross-section, the working first-sense circular transmit/second-sense circular receive radar cross-section, and the working asymmetry angle for each of the plurality of working points in the working radar data to determine whether the working points constitute target points or clutter points.

48. The system of claim 47, wherein the working radar data for the area of interest is collected using ground moving target indicator radar.

49. The system of claim 48, wherein the working data comprises range and Doppler working radar data.

50. The system of claim 47, wherein the first filter employs space-time adaptive processing.

51. The system of claim 50, wherein the first filter employs joint domain localized space-time adaptive processing.

52. The system of claim 47, wherein the first-sense is a left-sense and the second-sense is a right-sense.

53. The system of claim 47, wherein the first-sense is a right-sense and the second-sense is a left-sense.

54. The system of claim 47, wherein the working scattering matrix is derived from working vertical single pole data, working horizontal single pole data, and working cross pole data, the working cross pole data including at least one of a working vertical transmit and horizontal receive scan or a working horizontal transmit and vertical receive scan.

55. The system of claim 47, wherein the working scattering matrix is derived from working vertical single pole data, working horizontal single pole data, and working cross pole data, the working cross pole data including a working vertical transmit and horizontal receive scan and a working horizontal transmit and vertical receive scan.

56. The system of claim 47, further comprising:
 a collection of range and Doppler basis radar data for a representative area of interest;
 a second filter configured to suppress a clutter ridge appearing in the basis radar data;
 a look-up table processor for calculating for a plurality of basis points in the basis radar data a first-sense circular transmit/first-sense circular receive radar cross-section, a first-sense circular transmit/second-sense circular receive radar cross-section, and an asymmetry angle from a basis scattering matrix;
 a look-up table generator creating the look-up table of the first-sense circular transmit/first-sense circular receive radar cross-section, the first-sense circular transmit/second-sense circular receive radar cross-section, and the asymmetry angle for the plurality of points in the basis radar data; and
 a target identifier for classifying in the look-up table which combinations of the first-sense circular transmit/first-sense circular receive radar cross-section, the first-sense circular transmit/second-sense circular receive radar cross-section, and the asymmetry angle as target points and clutter points.

57. The system of claim 56, wherein the first-sense is a left-sense and the second-sense is a right-sense.

58. The system of claim 56, wherein the first-sense is a right-sense and the second-sense is a left-sense.

59. The system of claim 54, wherein the second filter uses space-time adaptive processing.

60. The system of claim 55, wherein the second filter uses joint domain localized space-time adaptive processing.

61. The system of claim 56, wherein the basis scattering matrix is derived from basis vertical single pole data, basis horizontal single pole data, and basis cross pole data, the basis cross pole data including at least one of a basis vertical transmit and horizontal receive scan or a basis horizontal transmit and vertical receive scan.

62. The system of claim 56, wherein the basis scattering matrix is derived from basis vertical single pole data, basis horizontal single pole data, and basis cross pole data, the basis cross pole data including a basis vertical transmit and horizontal receive scan and a basis horizontal transmit and vertical receive scan.

63. The system of claim 56, wherein the target identifier identifies the target points and the clutter points in the look-up table by comparing the basis radar data for the representative area of interest with predetermined data.

64. The system of claim 63, wherein the target identifier identifies the target points and the clutter points in the look-up table manually by classifying predetermined clutter points.

65. A computer readable medium having stored thereon instructions for detecting targets in radar signals, the instructions comprising:
  instructions for suppressing a clutter ridge appearing in a working radar data;
  instructions for calculating for a plurality of working points in the working radar data a working first-sense circular transmit/first-sense circular receive radar cross-section, a working first-sense circular transmit/second-sense circular receive radar cross-section, and a working asymmetry angle from a working scattering matrix; and
  instructions for comparing each of the plurality of working points to determine whether the working first-sense circular transmit/first-sense circular receive radar cross-section, the working first-sense circular transmit/second-sense circular receive radar cross-section, and the working asymmetry angle indicate the working points constitute target points or clutter points.

66. The computer readable medium of claim 65, further comprising instructions for creating a look-up table, the look-up table associating combinations of a first-sense circular transmit/first-sense circular receive radar cross-section, a first-sense circular transmit/second-sense circular receive radar cross-section, and an asymmetry angle as representing target points and clutter points such that the working first-sense circular transmit/first-sense circular receive radar cross-section, the working first-sense circular transmit/second-sense circular receive radar cross-section, and the working asymmetry angle can be looked up in the look-up table to classify the working point as a target point or a clutter point.

67. The computer readable medium of claim 66, further comprising working data for a working area of interest.

68. The computer readable medium of claim 67, wherein the working radar data for the area of interest is collected using ground moving target indicator radar.

69. The computer readable medium of claim 68, wherein the working data comprises range and Doppler working radar data.

70. The computer readable medium of claim 65, wherein the suppressing of the clutter ridge is accomplished with filtering.

71. The computer readable medium of claim 70, wherein the filtering applied to suppress the clutter ridge in the working radar data includes space-time adaptive processing.

72. The computer readable medium of claim 71, wherein the filtering applied to suppress the clutter ridge in the working radar data includes joint domain localized space-time adaptive processing.

73. The computer readable medium of claim 65, wherein the first-sense is a left-sense and the second-sense is a right-sense.

74. The computer readable medium of claim 65, wherein the first-sense is a right-sense and the second-sense is a left-sense.

75. The computer readable medium of claim 65, wherein the working scattering matrix is derived from working vertical single pole data, working horizontal single pole data, and working cross pole data, the working cross pole data including at least one of a working vertical transmit and horizontal receive scan or a working horizontal transmit and vertical receive scan.

76. The computer readable medium of claim 65, wherein the working scattering matrix is derived from working vertical single pole data, working horizontal single pole data, and working cross pole data, the working cross pole data including a working vertical transmit and horizontal receive scan and a working horizontal transmit and vertical receive scan.

77. A computer readable medium having stored thereon instructions for detecting targets in radar signals, the instructions comprising:
  instructions for suppressing a clutter ridge appearing in a basis radar data;
  instructions calculating for a plurality of basis points in the basis radar data a first-sense circular transmit/first-sense circular receive radar cross-section, a first-sense circular transmit/second-sense circular receive radar cross-section, and an asymmetry angle from a basis scattering matrix;
  instructions generating the look-up table of the first-sense circular transmit/first-sense circular receive radar cross-section, the first-sense circular transmit/second-sense circular receive radar cross-section, and the asymmetry angle for the plurality of points in the basis radar data; and
  instructions for classifying in the look-up table combinations of the first-sense circular transmit/first-sense circular receive radar cross-section, the first-sense circular transmit/second-sense circular receive radar cross-section, and the asymmetry angle as target points and clutter points.

78. The computer readable medium of claim 77, further comprising collecting basis radar data for a representative area of interest.

79. The computer readable medium of claim 78, wherein the basis radar data for the representative area of interest is collected using ground moving target indicator radar.

80. The computer readable medium of claim 79, wherein the basis radar data comprises range and Doppler basis radar data.

81. The computer readable medium of claim 77, wherein the suppressing of the clutter ridge is accomplished with filtering.

82. The computer readable medium of claim 81 wherein the filtering applied to suppress the clutter ridge in the basis radar data includes space-time adaptive processing.

83. The computer readable medium of claim 82, wherein the filtering applied to suppress the clutter ridge in the basis radar data includes joint domain localized space-time adaptive processing.

84. The computer readable medium of claim 77, wherein the first-sense is a left-sense and the second-sense is a right-sense.

85. The computer readable medium of claim 77, wherein the first-sense is a right-sense and the second-sense is a left-sense.

86. The computer readable medium of claim 77, wherein the basis scattering matrix is derived from basis vertical single pole data, basis horizontal single pole data, and basis cross pole data, the basis cross pole data including at least one of a basis vertical transmit and horizontal receive scan or a basis horizontal transmit and vertical receive scan.

87. The computer readable medium of claim 77, wherein the basis scattering matrix is derived from basis vertical single pole data, basis horizontal single pole data, and basis cross pole data, the basis cross pole data including a basis vertical transmit and horizontal receive scan and a basis horizontal transmit and vertical receive scan.

88. The computer readable medium of claim 77, wherein the identifying of the target points and the clutter points in the look-up table is derived manually by comparing the basis radar data for the representative area of interest with predetermined data.

89. The computer readable medium of claim 77, wherein the identifying of the target points and the clutter points in the look-up table is manually adjusted to classify predetermined clutter points.

* * * * *